United States Patent
El Gammal et al.

[11] Patent Number: 6,095,232
[45] Date of Patent: Aug. 1, 2000

[54] PROCESS AND DEVICE FOR PRODUCING METALLIC COMPOSITE MATERIALS

[75] Inventors: Tarek El Gammal, Aachen, Germany; Gamal Mohamed Megahed, Cairo, Egypt; Fritz-Peter Pleschuitschnigg, Duisburg; Ingo Von Hagen, Krefeld, both of Germany

[73] Assignee: Mannesmann Aktiengesellschaft, Düsseldorf, Germany

[21] Appl. No.: 08/945,468

[22] PCT Filed: May 17, 1996

[86] PCT No.: PCT/DE96/00907

§ 371 Date: Feb. 8, 1998

§ 102(e) Date: Feb. 8, 1998

[87] PCT Pub. No.: WO96/36744

PCT Pub. Date: Nov. 21, 1996

[30] Foreign Application Priority Data

May 19, 1995 [DE] Germany ............... 195 19 068

[51] Int. Cl.[7] .................................................. B22D 11/00
[52] U.S. Cl. ............................... 164/461; 164/419
[58] Field of Search ............................. 164/461, 419; 228/235.1, 235.2, 235.3

[56] References Cited

U.S. PATENT DOCUMENTS

| | | | |
|---|---|---|---|
| 3,350,773 | 11/1967 | Beebe, Jr. et al. | 228/235.3 |
| 4,257,549 | 3/1981 | Bricmont | 228/235.2 |

FOREIGN PATENT DOCUMENTS

| | | | |
|---|---|---|---|
| 61-17351 | 1/1986 | Japan | 164/461 |
| 62-148073 | 7/1987 | Japan | 164/461 |

*Primary Examiner*—Kuang Y. Lin
*Attorney, Agent, or Firm*—Cohen, Pontani, Lieberman & Pavane

[57] ABSTRACT

The invention is directed to a process for producing metallic composite material in which there is applied to at least one side of a parent strand a material having different material characteristics. For this purpose, according to the invention, the parent strand is guided through a melt having the same material composition as the parent strand, wherein melt crystallizes on by inversion casting and, at a predefinable distance from the surface of the molten bath, a composite section is fed to the carrier section after it has exited from the molten bath, this composite section being welded with the surface of the carrier section. The invention is further directed to a device for carrying out the process.

7 Claims, 1 Drawing Sheet

PROCESS AND DEVICE FOR PRODUCING METALLIC COMPOSITE MATERIALS

FIELD OF THE INVENTION

The invention is directed to a process for producing metallic composite material in which there is applied to at least one side of a parent strand a material having different material characteristics, and to a device for this purpose comprising a vessel having an opening at its base through which the parent strand can be guided through a metal melt which can be poured into the vessel and rollers for moving the strand when entering and exiting the melt.

BACKGROUND OF THE INVENTION

Essentially, spray compacting and inversion casting are known for connecting two metallic materials, one of which is an endless strand.

Apart from the complicated process management, a drawback in the first of these processes, in which an atomized metal spray is applied to a carrier section, consists in the substantial spray loss.

Further, the process is substantially limited to rotationally symmetric shapes.

The other method, inversion casting, is known, for example, from EP 0 311 602. A disadvantage of this process, in which a parent strand is guided through a melt and out of the bath such that it adheres to the surface thereof, is the requirement that the material of the parent strand be identical to or at least similar to that of the molten bath.

SUMMARY OF THE INVENTION

The object of the invention is to provide a process and a device required therefor by which metallic composite material sections whose material characteristics are distinctly different and which differ especially widely with respect to solidification temperature and melting point are produced in a simple manner.

According to the invention, a parent strand including a first amount of material per unit length is guided through a melt having the same material composition as the parent strand. As the parent strand is guided through the melt, a second amount of melt bonds with the parent strand to form a carrier strand. The speed at which the parent strand is guided is controlled so that the second amount of the melt which bonds per unit length to the parent strand is three to six times the first amount of material per unit length of the parent strand. A composite section is added to this carrier strand immediately after the carrier strand exits the molten bath and is welded with the carrier strand. The conventional problems associated with the welding together different materials of two and three-layer sheets such, for example, as connecting an austenitic steel with a carbon-containing steel are avoided using the inventive process as parent strand enters an austenitic melt at an operating temperature of 1465° C., which is accordingly at 15° C. above the melting point, the parent strand cannot melt at its surface with a melting point of 1520° C. A fast welding does not take place when there is such a great difference between the two melting temperatures.

According to the invention, for example, when producing strips where the finished strip has a thickness between 4 and 10 mm, a parent strip of C-steel is guided through a melt of identical or similar quality material (with respect to analysis). The three-fold to six-fold amount of melt crystallizes on both sides of this parent strip and the parent strip exits the molten bath as a carrier strip with a thickness of approximately 4 to 7 mm, with a carrier strip surface temperature of 1520° C. and in a pasty state. A thin composite strip with a thickness of roughly 0.2 to 1 mm is added to this carrier strip above the surface of the bath. The composite strip may be austenite, ferrite, or a nickel-containing steel whose melting point is in the range of 3% to 4% below the melting point of the melt. For this purpose, pairs of rollers are provided which, acting as smoothing rollers, weld the preheated thin composite strip with the carbon-containing carrier strip which is still partially liquid or still pasty (that is, the carbon-containing carrier strip is not completely solidified at its surface and still has a relatively high temperature).

The composite section, e.g., the stainless strip (austenite), is advantageously preheated by means of an induction furnace. Further, the composite strand is guided along the surface of the inversion crystallizer in such a way that the surface facing it is superheated.

In order to achieve a defect-free welding of the two-layer or three-layer composite material, influence is exerted on the materials of the parent strand and melt, on the temperature of the melt and the bath level, on the speed of the parent strand and accordingly on the contact time and amount of melt taken on by the strip to form the carrier section and, when joining the carrier section and composite section, on the contact pressure force exerted by the first roller pair above the molten bath.

An example of the invention is shown in the accompanying drawing.

DETAILED DESCRIPTION OF THE PREFERRED EMBODIMENTS

Figure 1:
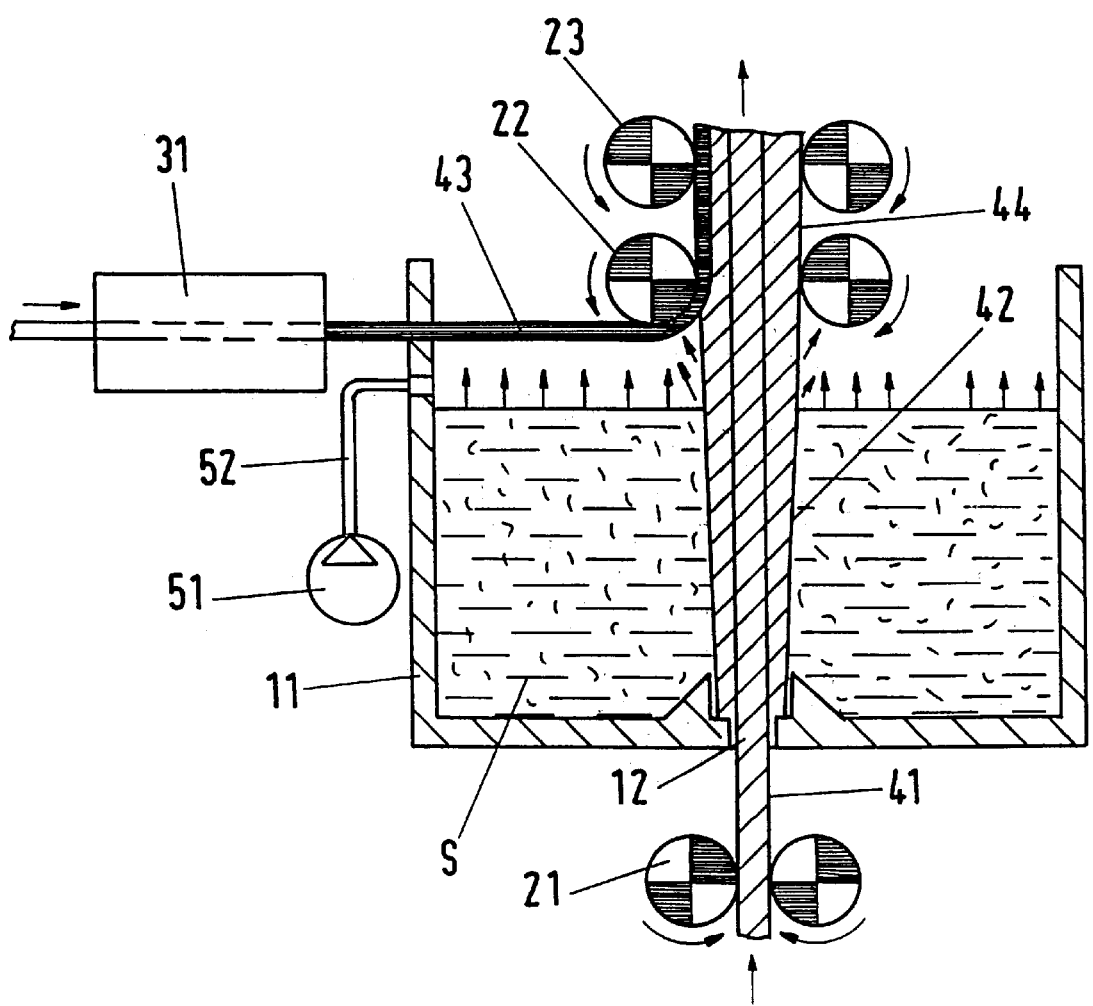
FIG. 1 shows a diagram of the device for producing metallic composite materials.

Referring to FIG. 1, an opening 12 is provided in the bottom of a vessel 11 filled with melt S and a parent strand 41 is being guided into the vessel 11 through this opening 12. The melt temperature is in the range 0.5% to 1.5% higher than the strand temperature. During the contact of the parent strand 41 with the melt S, a three-fold to six-fold amount of melt melt S crystallizes on both sides of the parent strand 41. The parent strand and three-fold to six-fold amount of melt S crystallized thereon exits the melt as a carrier.

The parent strand 41 is guided and moved through the feed rollers 21. Above surface of the molten bath, a composite section 43 is fed to the carrier section 42 from at least one side and is rolled onto the carrier section 42 via a deflecting roller 22. Take-off rollers 23 are provided for guiding and moving the finished strip 44 such that the composite section 43 is welded to the parent strand 41. A heating oven 31 is located outside of the vessel 11 for preheating the composite section 43.

Further, a gas conveying station 51 is provided, through which inert gas can be introduced via a feed line 52 into the intermediate space between the composite section 43 and the surface of the melt S for covering the carrier section 42 and at least a surface of the composite section 43 to be welded to the carrier section 42 with the inert gas.

The parent strand 41 and the carrier section 42 may comprise a strand, a sheet, or a pipe.

We claim:

1. A method for producing a metallic composite material, comprising the steps of:

guiding a parent strand comprising a first amount of material per unit length through a vessel containing a melt at a speed at which a second amount of melt per unit length crystallizes onto the parent strand that is three to six times the first amount of material per unit length of the parent strand to form a carrier strand, a material composition of the melt being the same as that of the parent strand;

feeding a composite section to at least one side of the carrier strand after the carrier strand has exited the melt in the vessel; and welding the composite section to the carrier strand which is still in a pasty state.

2. The method of claim 1, wherein said step of feeding a composite section further comprises the step of preheating the composite section with external energy.

3. The method of claim 2, wherein said step of feeding a composite section further comprises the step of guiding the composite section a distance above an upper surface of the melt such that a surface of the composite section which faces the melt is superheated.

4. The method of claim 3, further comprising the step of covering the surface of the composite material which faces the melt and the surface of the carrier strand to which the composite section will be welded with a protective gas.

5. The method of claim 1, wherein said step of feeding the composite section includes rolling the composition section onto the carrier section.

6. The method of claim 1, wherein said step of guiding a parent strand comprises the step of guiding a parent strand of carbon-containing steel through the melt which has an identical composition as the parent strand and the melt having a temperature in the range 0.5% to 1.5% higher than the temperature of the parent strand.

7. The method of claim 1, wherein the step of feeding a composite section comprises the step of feeding the composite section comprising one of ferrite, austenite, and a nickel-containing steel having a melting point in the range 3% to 4% below a melting point of the melt.

* * * * *